United States Patent
Kuboki et al.

(10) Patent No.: US 7,983,908 B2
(45) Date of Patent: Jul. 19, 2011

(54) NOISE-CANCELING DEVICE FOR VOICE COMMUNICATION TERMINAL USING CONFIGURABLE MULTIPLE DIGITAL FILTERS

(75) Inventors: Hiroshi Kuboki, Kanagawa (JP); Kenichi Kurihara, Saitama (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 1085 days.

(21) Appl. No.: 11/724,296

(22) Filed: Mar. 15, 2007

(65) Prior Publication Data

US 2007/0250314 A1    Oct. 25, 2007

(30) Foreign Application Priority Data

Apr. 19, 2006  (JP) ................. 2006-115351

(51) Int. Cl.
- *G10L 15/00* (2006.01)
- *G10L 21/00* (2006.01)
- *H04M 9/00* (2006.01)

(52) U.S. Cl. .............. 704/228; 379/388.07; 379/392.01; 704/233; 704/270

(58) Field of Classification Search .................... 704/228
See application file for complete search history.

(56) References Cited

U.S. PATENT DOCUMENTS 5,406,622 A * 4/1995 Silverberg et al. ....... 379/392.01

FOREIGN PATENT DOCUMENTS

| EP | 1533898 A | 5/2005 |
|---|---|---|
| JP | 63-269613 | 11/1988 |
| JP | 02-92225 | 7/1990 |
| JP | 05-252253 | 9/1993 |
| JP | 7-15264 | 1/1995 |
| JP | 07-42236 | 7/1995 |
| JP | 07-235969 | 9/1995 |
| JP | 08-234746 | 9/1996 |
| JP | 2000-082961 | 3/2000 |
| JP | 2001-185991 | 7/2001 |
| JP | 2001-285409 | 10/2001 |
| JP | 2005-244541 | 9/2005 |

OTHER PUBLICATIONS

Machine Translation of Takeshi (JP-2001-185991), in which the Japanese document was supplied by applicant on Dec. 15, 2008.*
Foreign Office Action issued on Sep. 24, 2008 in the corresponding JP application 2006-115351 with an English translation.

* cited by examiner

*Primary Examiner* — Justin W Rider
(74) *Attorney, Agent, or Firm* — Rabin & Berdo, P.C.

(57) ABSTRACT

A noise-canceling device of a voice communication terminal that removes noise elements included in received voice signals. The device comprises: a digital filter array that exhibits filter qualities in response to a coefficient setting signal showing each supplied arrays of filter coefficients, and includes a first-stage filter that receives the received voice signals as well as multiple later-stage filters connected thereto in a straight line; a filter qualities designator that generates input designation that designates each qualities of the multiple digital filters forming the digital filters array; and a filter coefficient setter that retains multiple arrays of filter coefficients, extracts a filter coefficient array corresponding to the designation input from among the multiple filter coefficient arrays, and supplies to each multiple digital filters. The noise-canceling device for a voice communication terminal provided to obtain desired filter qualities in real-time without calculation of filter coefficients.

7 Claims, 4 Drawing Sheets

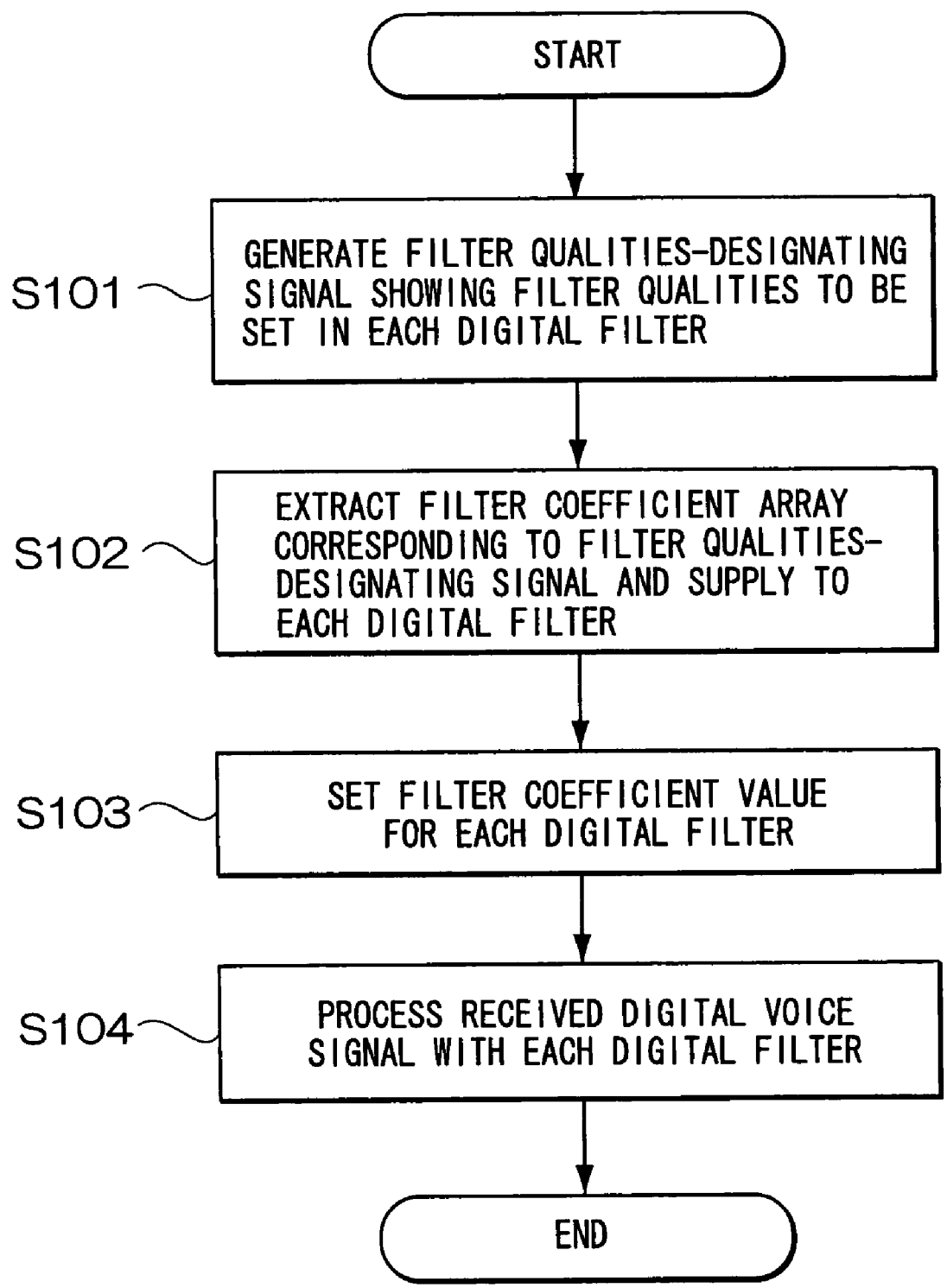

NOISE-CANCELING DEVICE FOR VOICE COMMUNICATION TERMINAL USING CONFIGURABLE MULTIPLE DIGITAL FILTERS

BACKGROUND OF THE INVENTION

1. Field of the Invention

The present invention relates to a voice communication terminal's noise-canceling device that cancels only specified frequency components of a voice signal.

2. Description of the Related Art

With a voice communication terminal such as a telephone, there are cases where the speaker is calling under conditions where there is a lot of noise or where noise is mixed into the phone line. In order to prevent the caller's voice from becoming difficult to hear due to such noise, a filter provided in a phone is known that allows only signals of a specified frequency band to pass through. This filter is designed to perform processing on the caller's voice in order to make it clear. In this case, the filter used in the phone is provided with only fixed qualities or characteristics that allow only, for example, the frequency band of a person's voice to pass through (see Official Gazette of JP-A No. 05-252253).

Meanwhile, another device is known where noise can be detected, noise such as that mixed into the electrical waves of phone lines or wireless radio or noise that enters the microphone provided in the phone device. The device calculates the filter coefficient in accordance with the detected noise level. It is designed so that, by setting this coefficient in the digital filters, the filter qualities of those digital filters can be appropriately changed and the caller's voice is clarified (see Official Gazette of JP-A No. 07-235969).

Nonetheless, there are various frequency bands for both human voices and noise. Accordingly, with only a single filter such as in the above-described first invention, where the frequency qualities are fixed, it is difficult to obtain a caller's voice that is clear under all conditions.

Also, in a phone device such as in the second of the above-described inventions, when a filter coefficient is calculated in accordance with a detected noise level and the qualities of the digital filter are changed appropriately, calculation of the filter coefficient performed in order to improve the problematic point of the first invention takes time. As a result, a delay is generated in the time it takes for the speaker's voice to be outputted from the speaker of the phone device. When communicating by voice, if the delay of the callers' voices becomes great, the tempo of the conversation shifts and the conversation itself becomes difficult. This is especially the case with IP phones that use a Voice-over Internet Protocol (VoIP) where there are inherently lags or delays that accompany voice compression and decompression processing, delays caused by packetization, and delays generated when the IP packet passes through a network. Further increases in lag time caused by other factors are not preferable in the real-time qualities required in voice communication.

The present invention was made in point of the above, and provides a noise-canceling device of a voice communication terminal that can obtain the desired filter qualities in real-time without calculating filter coefficients.

SUMMARY OF THE INVENTION

The noise-canceling device of a voice communication terminal for the present invention is a device that cancels noise elements included in a received voice signal received through a communication network, comprising: a digital filter array that exhibits a filter quality in response to a filter coefficient signal showing each of the supplied arrays of filter coefficients, and includes a first-stage filter that receives the received voice signal as well as a plurality of later-stage filters connected thereto in a straight line; a filter qualities designator that generates designation inputting that designates each of the qualities of the plurality of digital filters forming the array of digital filters; and a filter coefficient setter that retains a plurality of filter coefficient arrays, extracts a filter coefficient array corresponding to the designation inputting from among the plurality of filter coefficient arrays and supplies it to each of the plurality of digital filters as a filter coefficient signal.

BRIEF DESCRIPTION OF THE DRAWINGS

Preferred exemplary embodiments of the present invention will be described in detail based on the following figures, wherein:

FIG. 4 is a flowchart showing the operation of the noise-canceling device that is an embodiment of the present invention.

DETAILED DESCRIPTION OF THE INVENTION

Figure 1:
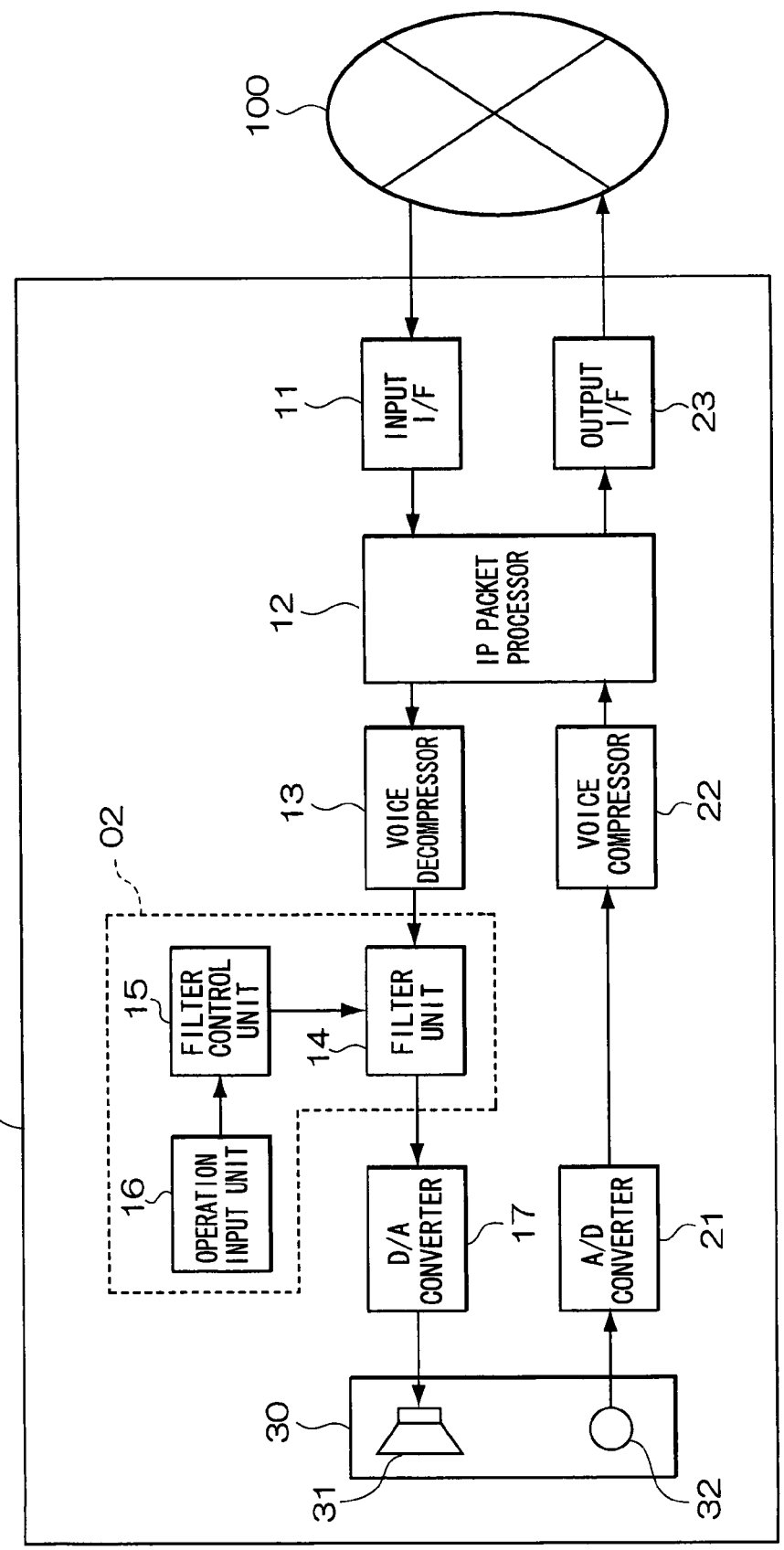
FIG. 1 is a function block diagram of an IP phone terminal equipped with the noise-canceling device that is an embodiment of the present invention.

Hereafter, the exemplary embodiments of the present invention will be explained while referring to the drawings. In the present exemplary embodiment, examples will be explained where the present invention is applied to an IP phone terminal, however, the present invention is not limited thereto. The present invention can also be applied to voice communication terminals such as mobile phones and personal handy-phone system terminals (PHS) that send and receive digital voice signals and replay them, or to VoIP gateways that are provided between a regular phone and an IP network and which perform call control, or to any device that processes other digital voice signals. FIG. 1 is a function block diagram of an IP phone terminal 01 that acts as a voice communication terminal and is equipped with the noise-canceling device of the present invention.

An input interface 11 is an interface that is connected to an IP network 100 such as the Internet or an intranet, and is for receiving IP packets in which digital voice signals supplied via the IP network 100 are stored. The received packets received by the input interface 11 are sent to the IP packet processor 12.

The IP packet processor 12 accumulates the received packets received from the input interface 11 once, adjusts the arrival time intervals between the packets, performs reverse-packetization processing, and then generates a received digital voice signal. More specifically, with VoIP, an RTP header is attached to the voice data. Sequence numbers showing the order of the IP packets and time stamps showing the processing time are included in this RTP header. The IP packet processor 12 stores to a buffer memory (not shown) in order of the sequence numbers written in the RTP header of the received packet and performs reverse packetization processing in accordance with the time stamp. The generated received digital voice signal is supplied to the voice decompressor 13.

Further, in the case where the IP packet processor 12 sends via the IP network 100 a voice inputted from a microphone 32 to the party being called, the digitally encoded sent digital voice signal is packetized at, e.g., 20 millisecond units, the RTP header, UDP header and IP header are added, and a send packet is generated. The generated send packet is sent to an output interface 23.

The voice decompressor 13 performs decompression of the received digital voice signal compressed by set encoding of, e.g., a system such as Conjugate Structure Algebraic Code Excited Linear Prediction (CS-ACELP), and then supplies this to a filter unit 14.

An operation input unit 16 is provided with a wide array of operation buttons (not shown), such as push buttons for entering a telephone number, a volume control button for adjusting the receiving volume, and a hold button for activating an on-hold tone during a call, as well as a filter quality-designation button (not shown) for setting the filter qualities of the filter unit 14 that will be described later. When this filter quality-designation button is operated by the user and the filter quality is designated, the operation input unit 16 generates a filter quality-designation signal in response and supplies this to a filter control unit 15.

The filter control unit 15 retains in a memory (not shown) multiple filter coefficient arrays set in the filter unit 14 in advance for preset filter qualities to be exhibited. The filter control unit 15 extracts from the memory the filter coefficient arrays corresponding to the filter quality-designation signal supplied from the operation input unit 16 and supplies them to the filter unit 14 as a filter coefficient signal.

The filter unit 14 sets the filter coefficient based on the filter coefficient signal showing the filter coefficient arrays supplied from the filter control unit 15, whereby filter qualities are exhibited that reflect the filter coefficient. That is, the filter unit 14 obeys the set filter coefficient and functions as a low-pass filter, a high-pass filter or a band-pass filter, and performs the removal of noise and static mixed into the received digital voice signal. The filtered received digital voice signal is sent to a D/A converter 17.

The noise-canceling device 02 of the present invention is made up of the above-described filter unit 14, filter control unit 15 and operation input unit 16.

The D/A converter 17 converts the received digital voice signal into analog and generates a received analog voice signal. The generated received analog signal is sent to a speaker 31 provided in the handset 30.

The handset 30 receives sound pressure variations and the speaker 31 that outputs the received analog voice signal supplied by the D/A converter 17 as a voice. A microphone 32 that generates a sending analog voice signal in response to the sound pressure variations is provided. The generated sending analog voice signal is sent to an A/D converter 21.

The A/D converter 21 digitally converts the sending analog voice signal supplied from the microphone 32 with a PCM system and the like, and generates a sending digital voice signal. Specifically, the A/D converter 21 samples the analog voice signal at 8 KHz, and the sending digital voice signal is generated due to quantization at eight bits. The generated sending digital voice signal is sent to a voice compressor 22.

The voice compressor 22 performs compression of the sending digital voice signal that was digitally converted with a system such as PCM with, e.g., a preset system such as CS-ACELP. The compressed sending digital voice signal is sent to the IP packet processor 12. The IP packet processor 12 divides the sending digital voice signal at preset time intervals, adds the RTP header, UDP header and IP header, and a sending packet is generated, as described above. The generated sending packet is sent to the output interface 23.

The output interface 23 is connected to the IP network 100 and is an interface for sending the sending packet to the calling destination via the IP network 100.

Figure 2:
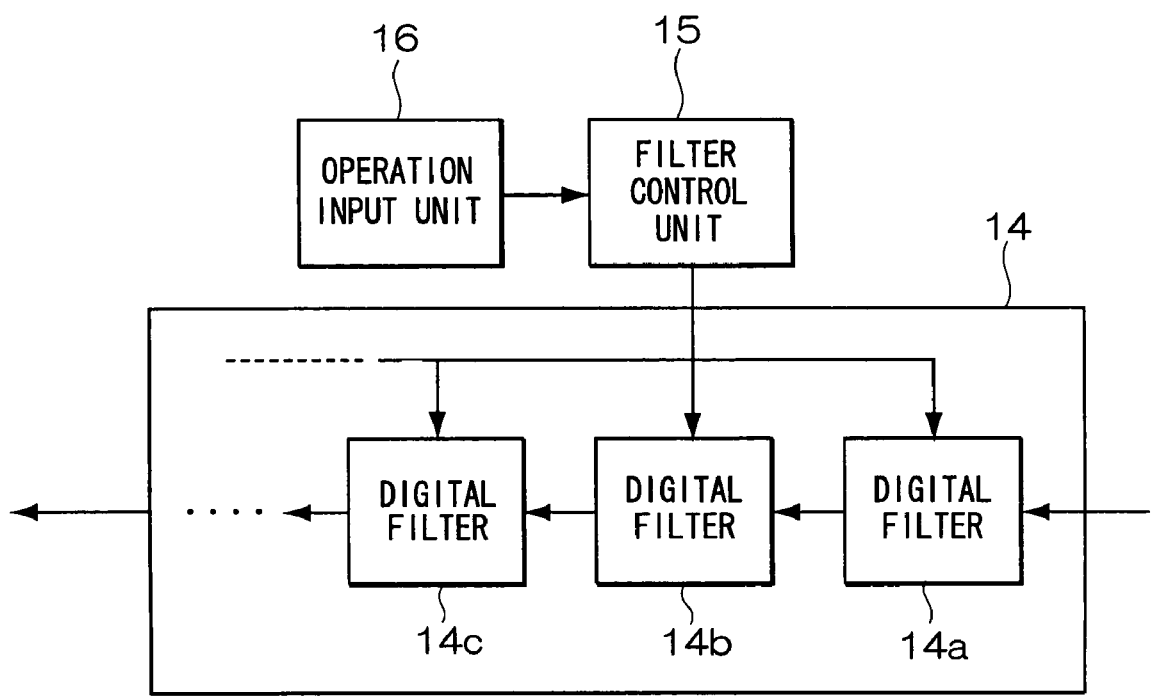
FIG. 2 is a drawing showing the configuration of a filter unit that is an embodiment of the present invention.

Next, the detailed configuration of the filter unit 14 will be explained while referring to FIG. 2. As shown in FIG. 2, the filter unit 14 includes multiple digital filters 14a, 14b, 14c and so on connected in a straight line. The receiving digital voice signal supplied from the voice decompressor 13 is inputted to the digital filter 14a and the output from the digital filter 14a is inputted to the digital filter 14b and further, the output from the digital filter 14b is inputted to the digital filter 14c. In other words, the device is configured so that the received digital voice signal inputted to the filter unit 14 is filtered multiple times by each of the multiple digital filters 14a, 14b, 14c, etc.

Filter coefficient signals displaying filter coefficient arrays are individually supplied from the filter control unit 15 to each of the digital filters 14a, 14b, 14c, etc. Each digital filter respectively exhibits its own filter characteristics based on the filter coefficient arrays.

As described above, the filter control unit 15 retains multiple arrays of filter coefficients in the memory in order to specify the filter qualities of the digital filters 14a, 14b, 14c, etc. That is, the filter control unit 15 retains multiple filter coefficient arrays so as to make each of the digital filters 14a, 14b, 14c, etc. function as high-pass filters or low-pass filters of a desired cutoff frequency. By retaining multiple filter coefficient arrays in the filter control unit 15, when the digital filters 14a, 14b, 14c, etc. are made to function as high-pass filters or low-pass filters, the cutoff frequency can be adjusted at, e.g., steps of 100 Hz.

When the filter control unit 15 receives a filter quality-designation signal from the operation input unit 16, the filter control unit 15 extracts the filter coefficient arrays that correspond to the filter quality-designation signals retained in the memory (not shown), and these are supplied to each of the digital filters 14a, 14b, 14c, etc. as filter coefficient signals.

A filter quality-designation button (not shown) is provided in the operation input unit 16. This makes it possible to select the type of filter (i.e., high-pass/low-pass) and cutoff frequency for each of the digital filters 14a, 14b, 14c, etc. Operation of this filter quality designation in the operation input unit 16 is performed by selecting the desired quality regarding each digital filter from a filter quality menu set in advance.

Figure 3:
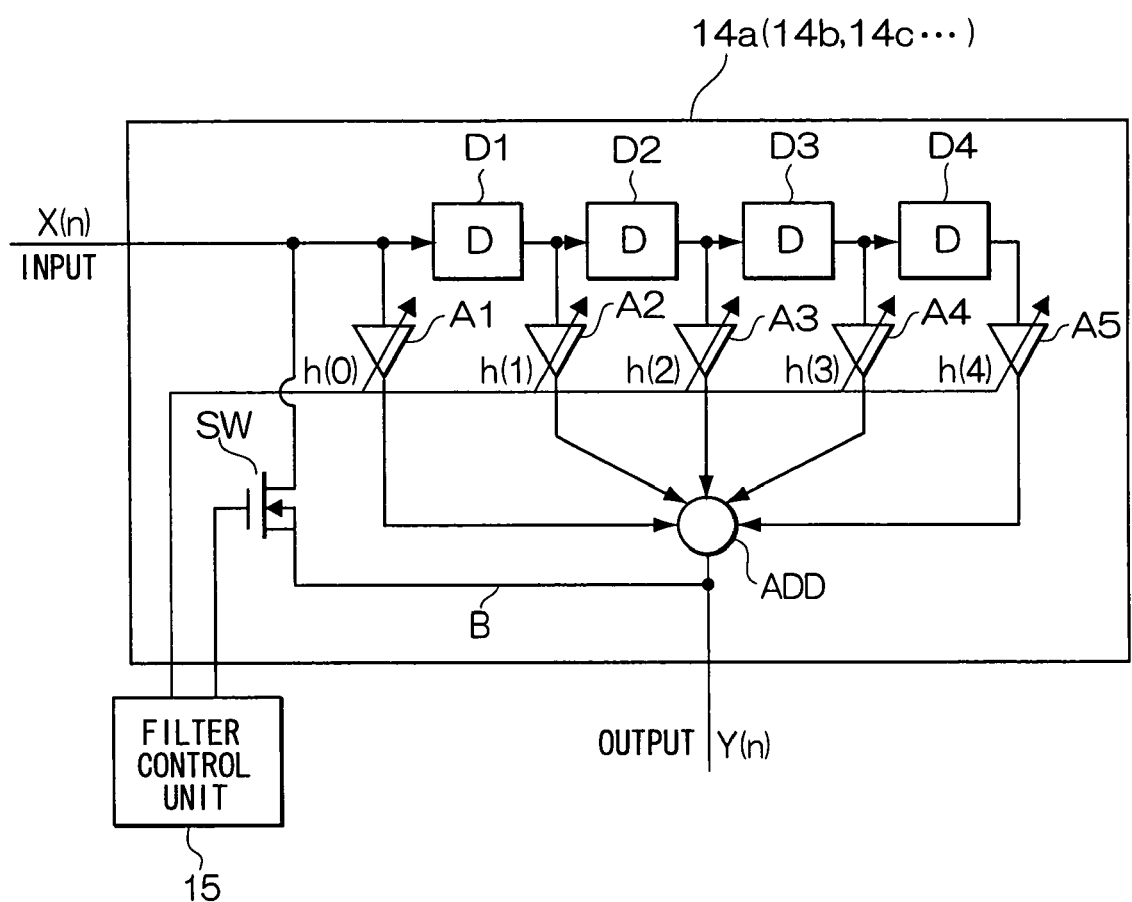
FIG. 3 is a drawing showing the configuration of a digital filter that is an embodiment of the present invention.

FIG. 3 is a drawing showing the detailed configurations of the digital filters 14a, 14b, 14c, etc. Each of the configurations of all the digital filters 14a, 14b, 14c, etc. are identical. Also, as shown in FIG. 3, the device includes multiple delay elements D1-D4 connected in a straight line; multiple multipliers A1-A4 connected to the output terminals of each of the delay elements D1-D4; and an adder ADD that adds the output of each of the multipliers A1-A4. Note that in FIG. 3, the configuration of the four successive digital filters was set as one example with four delay elements and five multipliers, however, these can be appropriately altered in accordance with factors such as delay time and the desired filter capability.

A receiving digital voice signal line X (n) is sequentially inputted to the delay element D1 in synchronization with the sampling cycle. This is delayed by one clock only and then supplied to the delay element D2 while also being supplied to the multiplier A2. Similarly, the receiving digital voice signal line X (n) supplied sequentially from the delay element D1 is delayed by one clock by the delay element D2 and then supplied to the delay element D3 while also being supplied to the multiplier A3. The same processing is performed for delay elements D3 and D4.

Coefficient values h(0)-h(4) are respectively set in each of the multipliers A1-A5 with the filter coefficient signal showing the filter coefficient arrays supplied from the filter control unit 15. The multiplier A1 multiplies the sequentially inputted receiving digital voice signal line X (n) and the set coefficient value h(0), and the multipliers A2-A5 multiply the receiving digital voice signal line X (n) to which delay time supplied from each of the delay elements D1-D4 was added and the set coefficient values h(1)-h(4) set in each of the multipliers A2-A5.

The adder ADD adds the outputs of each of the multipliers A1-A5 for each sampling cycle and these results are outputted as output signal lines Ya(n), Yb(n), Yc(n), etc. of each of the digital filters 14a, 14b, 14c, etc.

The desired filter quality is exhibited by each of the digital filters 14a, 14b, 14c, etc. setting the appropriate filter coefficients h(0)-h(4).

As described above, the output signal line Ya(n) of the first digital filter 14a is inputted as an input signal line to the digital filter 14b of the next step. The digital filter 14b performs computation of convolution as in the above-described processing for the signal line Ya(n) and outputs an output signal line Yb(n). The same process is performed from the digital filter 14c onward, and the filter unit 14 ultimately outputs an output signal line Y(n).

Therefore, due to the setting of the filter coefficients, each of the digital filters 14a, 14b, 14c, etc. can be provided with various filter qualities. Further, by combining each of the digital filters as an entire filter unit 14, it becomes possible to exhibit predetermined filter qualities that are not provided as filter coefficient arrays. In other words, the device is configured so that, due to combinations of predetermined filter qualities provided, exhibit predetermined filter qualities not provided as filter coefficient arrays is possible.

Further, as shown in FIG. 3, a switch element SW is provided at each digital filter. The filter control unit 15 does not supply a filter control signal to the digital filters not in use due to operation of the operation input unit 16. The filter control unit 15 generates a drive signal for driving the switch element SW corresponding to those digital filters not in use and turns on the switch element SW. When the switch element SW turns on, electricity is conducted to between the inputs and outputs of the digital filters, whereby a bypass path B that diverts between the inputs and outputs is formed. A received digital voice signal inputted to the digital filter is outputted via this bypass path B. That is, a received digital voice signal inputted into a digital filter not in use passes through the digital filter without passing through the above-described delay elements D1-D4, the multipliers A1-A4, or the adder ADD. Due to this, it becomes possible for the inputted received digital voice signal to avoid delays that accompany passage through the delay elements D1-D4.

Next, the performance of the noise-canceling device of the present invention will be explained while referring to the flowchart of FIG. 4.

In the explanations that follow, the first digital filter 14a is made to function as a high-pass filter of a cutoff frequency of 300 Hz due to operation of a filter quality-designation button (not shown) provided in the operation input unit 16. The second digital filter 14b is made to function as a low-pass filter of a cutoff frequency of 3 KHz due to appropriate operation.

The operation input unit 16 follows the operation input of the filter quality-designation button, generates a filter quality-designation signal showing the type of filter and cutoff frequency that should be set in each digital filter, and then supplies the signal to the filter control unit 15 (Step S01).

The filter control unit 15 receives this signal and extracts a filter coefficient array ha(m) corresponding to the qualities of a high-pass filter with a cutoff frequency of 300 Hz from among the filter coefficient arrays set in advance and retained in the memory. The filter control unit 15 supplies this to the first digital filter 14a as a filter control signal and extracts a filter coefficient array hb(m) corresponding to the qualities of a low-pass filter with a cutoff frequency of 3 KHz and supplies this to the second digital filter 14b as a filter control signal (Step S02). Since the digital filters from the third one down are not used, a filter control signal is not sent, but a drive signal for driving the switch element SW is supplied. Due to this, a bypass path B is formed between the inputs and outputs of the digital filters not in use.

The digital filters 14a and 14b that receive the filter control signal set the filter coefficient value based on this in each of the multipliers A1-A5 (Step S03).

The digital filter 14a performs computation of convolution between the set filter coefficient value and the receiving digital voice signal line X(n) supplied from the voice decompressor 13, outputs an output signal line Ya(n) and supplies this to the second digital filter 14b. Next, the digital filter 14b performs computation of convolution between the set filter coefficient value and the output signal line Ya(n) outputted from the digital filter 14a, and outputs an output signal line Yb(n). The output signal line Yb(n) outputs an output signal line Y(n)(=Yb(n)) as the final output of the filter unit 14 via the bypass path B formed from the third digital filter onward (Step S04).

The receiving digital voice signal passes through both the digital filter 14a that functions as a high-pass filter with a cutoff frequency of 300 Hz and the digital filter 14b that functions as a low-pass filter with a cutoff frequency of 3 KHz, whereby frequency components outside of the frequency band of 300 Hz-3 KHz are removed. That is, by combining these filters, the filter unit 14 functions as a band pass filter where the pass band is 300 Hz-3 KHz.

As is clear from the above explanations, with the noise-canceling device of the present invention, multiple digital filters are provided in a straight line and connected to each other, and each filter quality for these multiple digital filters can be selectively set. By appropriately combining these, the filters can be configured to have desired filter qualities that are not provided in advance. Further, the order in which voice signals are made to pass as well as the number of times they pass can be freely set as well. Due to this, with the noise-canceling device of the present invention, diverse filter qualities can be provided. So, even with a single filter where conventional frequency qualities are fixed, by appropriately combining the filter qualities, it becomes possible to cancel even noise that could not be sufficiently cancelled, and an even clearer conversation voice can be obtained.

Further, the characteristics or qualities of each digital filter are set by selecting arrays of filter coefficients that correspond to the desired qualities from among arrays of filter coefficients retained in advance in the memory, so calculation of filter coefficients is not performed. That is, processing time for calculating filter coefficients is not necessary and the transmission delay of the voice signal that accompanies filtering processing can be suppressed to a minimum. Accordingly, the present invention is also very applicable to IP phones, where transmission delays of voice calls are a further increasing problem.

What is claimed is:

1. A noise-canceling device of a voice communication terminal that cancels noise elements included in a received packetized voice signal received through a packet-based communication network, comprising:
   a digital filter array that exhibits a filter quality by combining a plurality of filter qualities of a plurality of digital filters, wherein:
      the digital filter array including a first-stage digital filter that receives the received voice signal as well as a plurality of later-stage digital filters coupled thereto in linear succession; and
      each digital filter of the digital filter array exhibits a respective filter quality in response to a filter coefficient signal containing a plurality of respective supplied arrays of filter coefficients;
   a filter qualities designator configured to receive an input that designates each of the filter qualities of the plurality of digital filters forming the array, and generates a filter-quality designation signal based on a received designator input;
   a filter coefficient setter that retains a plurality of filter coefficient arrays, extracts a filter coefficient array from among the plurality of filter coefficient arrays based on the filter-quality designation signal, supplies a respective filter coefficient array to each of the plurality of digital filters as a filter coefficient signal, whereby the plurality of filters of the digital filter array collectively exhibit a filter quality that is not exhibited by each of the plurality of filters according to the respective filter coefficient array;
   a plurality of on/off switch elements connected between each input and output of each digital filter of the array of digital filters; and
   a switch driver that selectively drives the on/off switch elements;
   wherein:
   the filter qualities designator includes a filter type selection section that selects the type of the filter for each of the plurality of digital filters such that the digital filters function as a low-pass filter or a high-pass filter, and a cutoff frequency selection section that selects the cutoff frequency of each of the plurality of digital filters; and
   the switch driver forms a bypass path by driving the on/off switch elements that correspond to the digital filters for which filter quality has not been designated by the filter qualities designator.

2. The noise-canceling device of a voice communication terminal of claim 1, wherein the packetized voice signal is received through an IP packet-based communication network.

3. The device of claim 2, wherein the later stage filters are connected to the first stage filter in linear succession.

4. The device of claim 2, further comprising:
   a plurality of on/off switch elements connected between each input and output of each filter of the plurality of digital filters; and
   a switch driver configured to selectively drive the on/off switch elements;
   whereby the switch driver forms a bypass path by driving the on/off switch elements that correspond to the digital filters for which filter quality has not been designated by the filter qualities designator.

5. A noise-canceling device of a voice communication terminal configured for canceling noise elements included in a packetized voice signal received through a packet-based communication network, comprising:
   an array of digital filters including a first-stage digital filter that is configured to receive the packetized voice signal, and a plurality of later-stage digital filters coupled thereto in linear succession;
   a filter qualities designator configured to generate a filter quality designation signal that selectively designates a respective filter quality for each digital filter of the digital filter array;
   a filter coefficient setter configured to:
      retain a plurality of predetermined filter coefficient arrays;
      extract a respective filter coefficient array for the respective designated filter quality from among a plurality of predetermined filter coefficient arrays according to the filter quality designation signal; and
      supply the respective filter coefficient arrays to respective digital filters of the digital filter array as a respective filter coefficient signal so as to configure the respective digital filters to exhibit the respective designated filter qualities in response to the respective filter coefficient signals, whereby:
      the array of digital filters is configurable to exhibit a filter quality that is not exhibited by any one of the plurality of filter coefficient arrays;
   a plurality of on/off switch elements connected between each input and output of each digital filter of the plurality of digital filters; and
   a switch driver configured to selectively drive the on/off switch elements;
   wherein:
   the filter qualities designator includes a filter type selection section configured to select the type of the filter for each of the plurality of digital filters such that the digital filters are configured to function as low-pass filters or a high-pass filters, and a cutoff frequency selection section configured to select the cutoff frequency of each of the plurality of digital filters; and
   the switch driver is configured to drive the on/off switch elements that correspond to the digital filters for which filter quality has not been designated by the filter qualities designator, so as to form a bypass path.

6. The noise-canceling device of a voice communication terminal of claim 5, wherein the packetized voice signal is received through an IP packet-based communication network.

7. A device that filters elements in a voice signal received through a communication network, comprising:
   a digital filter array including a first-stage filter configured for receiving the voice signal and a plurality of later-stage filters connected to the first-stage filter, whereby the array is configured to exhibit an aggregate filter quality in response to a filter-quality designation signal containing a plurality of filter coefficient arrays;
   a filter qualities designator configured to generate the filter-quality designation signal based on an input that designates a plurality of respective filter qualities for a plurality of respective filters in the digital filter array, whereby the plurality of filter qualities determine the aggregate filter quality of the digital filter array;
   a filter coefficient setter configured to:
      retain a plurality of filter coefficient arrays;
      extract from the plurality of filter coefficient arrays one or more respective filter coefficient arrays, each respective extracted filter coefficient array being designated for a respective one or more of the filters of the digital filter array, the respective designations being determined according to the filter-quality designation signal; and supply to each of the plurality of filters of the digital filter array, via the filter quality designation signal, a respective filter coefficient signal;

whereby the digital filter array is configurable to exhibit an aggregate filter quality which is not exhibited by each of the plurality of filters according to the respective filter coefficient signal;

wherein the filter qualities designator includes:
a filter type selection section that is configurable to select the type of the filter for each of the plurality of digital filters such that each digital filter is configurable to function as a low-pass filter or a high-pass filter; and a cutoff frequency selection section that is configurable to select the cutoff frequency of each of the plurality of digital filters.

* * * * *